United States Patent
Murakami

(10) Patent No.: US 9,645,568 B2
(45) Date of Patent: May 9, 2017

(54) NUMERICAL CONTROLLER HAVING COMMAND PATH COMPRESSION FUNCTION

(71) Applicant: FANUC Corporation, Minamitsuru-gun, Yamanashi (JP)

(72) Inventor: Hiroki Murakami, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 286 days.

(21) Appl. No.: 14/620,279

(22) Filed: Feb. 12, 2015

(65) Prior Publication Data

US 2015/0227131 A1  Aug. 13, 2015

(30) Foreign Application Priority Data

Feb. 13, 2014 (JP) .................................. 2014-025758

(51) Int. Cl.
  *G05B 19/19*  (2006.01)
(52) U.S. Cl.
  CPC .... *G05B 19/19* (2013.01); *G05B 2219/42338* (2013.01)
(58) Field of Classification Search
  CPC ...................................................... G05B 19/19
  USPC ........................ 318/573, 570, 569, 567, 560
  See application file for complete search history.

(56) References Cited

U.S. PATENT DOCUMENTS

| 5,309,074 A * | 5/1994 | Mizukami ............ G05B 19/416 318/571 |
| 2012/0016514 A1 | 1/2012 | Nakamura et al. |
| 2013/0218323 A1 | 8/2013 | Otsuki |

FOREIGN PATENT DOCUMENTS

| JP | S62-204313 A | 9/1987 |
| JP | S63-136209 A | 6/1988 |
| JP | H03-230201 A | 10/1991 |
| JP | H10-49215 A | 2/1998 |
| JP | H10-301614 A | 11/1998 |
| JP | 2006-139503 A | 6/2006 |
| JP | 2013-171376 A | 9/2013 |
| WO | WO-2010/140390 A1 | 12/2010 |

OTHER PUBLICATIONS

Notification of Reasons for Refusal issued Jul. 14, 2015 in Japanese Patent Application No. 2013-025758 (4 pages) with an English Translation (4 pages).

* cited by examiner

*Primary Examiner* — David S Luo
(74) *Attorney, Agent, or Firm* — Drinker Biddle & Reath LLP

(57) ABSTRACT

A numerical controller extracts a subsequence from a sequence of command points obtained from a machining program in a manner such that the same path may be created regardless of whether the sequence of command points is extracted from the commanded direction or from the reverse direction. A compressed path approximated by a straight line or a curve is created in a manner such that the compressed path may be approximated by the same straight line or curve regardless of whether the compressed path is created from the extracted subsequence in a commanded direction or in the reverse direction.

9 Claims, 6 Drawing Sheets

NUMERICAL CONTROLLER HAVING COMMAND PATH COMPRESSION FUNCTION

RELATED APPLICATION DATA

This application claims priority under 35 U.S.C. §119 and/or §365 to Japanese Application No. 2014-025758 filed Feb. 13, 2014, the entire contents is incorporated herein by reference.

BACKGROUND OF THE INVENTION

1. Field of the Invention

The present invention relates to a numerical controller that creates a processing path based on a sequence of command points acquired from a machining program with respect to a machine tool having a plurality of driving axes including at least two straight-line axes, interpolates the path, and drives the driving axes to the interpolated position, thereby performing machining.

2. Description of the Related Art

Japanese Patent Application Laid-Open No. 10-049215 discloses a technique of approximating a path commanded as a point sequence by a straight-line path and performing machining along the straight-line path.

Japanese Patent Application Laid-Open No. 2013-171376 discloses a technique of approximating a path commanded as a point sequence by the smallest possible number of curves such that deviation from a command point is within a set threshold (tolerance) and driving a servo motor along the curves, thereby performing machining.

A technique of approximating a sequence of multiple command points covering a wide range by a straight line or a curve of which the distance from the sequence of command points is within an allowable threshold (tolerance) is called compression of a sequence of command points. With multiple command points represented by one curve, the curve corresponding to the sequence of command points covering a wide range can be created, whereby deceleration due to insufficient ability to create a machining curve of a numerical controller and interpolate the machining curve can be reduced even if the intervals in the sequence of command points are very small.

With the above-described techniques disclosed in Japanese Patent Application Laid-Open No. 10-049215 and Japanese Patent Application Laid-Open No. 2013-171376, the compression methods have direction dependence property, that is, the compression result depends on from which direction the point sequence is compressed. For this reason, the above-described techniques have a problem that when the same command is made in the reverse direction, the same compression result cannot be assured, causing an uneven path in processing using a reciprocation path.

SUMMARY OF THE INVENTION

The present invention addresses the problems of the above-described prior art techniques with the object of providing a numerical controller that has a command path compression function, with which, in compression of a sequence of command points in the above-described prior art techniques, the same compression result can be obtained from the same sequence of command points while the sequence of command points is sequentially read, regardless of whether the sequence of command points is given in the forward direction or in the reverse direction.

The present invention relates to a numerical controller that controls a machine tool. The machine tool is composed of a plurality of driving axes including at least two straight-line axes that perform processing on a workpiece attached to a table. The numerical controller includes a command reading unit, a subsequence extraction unit, a point sequence compression unit, an interpolation unit, and a motor driving unit. The command reading unit reads a command path being a sequence of a plurality of command points and a relative feed speed command of the workpiece and a tool. The subsequence extraction unit extracts a subsequence from the sequence of command points to divide the sequence of command points in a manner such that the same path may be created regardless of whether the command points read are extracted by the command reading unit from a commanded direction or from a direction reverse to the commanded direction. The point sequence compression unit creates a compressed path approximated by a straight line or a curve of which the distance from each command point in the extracted subsequence is within a preset tolerance in a manner such that the compressed path may be approximated by the same straight line or curve regardless of whether the compressed path is created from the extracted subsequence in a commanded direction or in a direction reverse to the commanded direction. The interpolation unit obtains the position of each axis for each interpolation cycle in a manner such that the tool may move at the commanded relative feed speed on the path compressed by the point sequence compression unit. And the motor driving unit drives a motor of each axis to move to the position of each axis obtained by the interpolation unit.

The numerical controller may further include a division reference length setting unit configured to set a division reference length used for extracting a subsequence from the sequence of command points to divide the sequence of command points, wherein division performed by the subsequence extraction unit is determined depending on whether a length between command points is within the division reference length or not.

The numerical controller may further include a division reference angle setting unit configured to set a division reference angle used used for extracting a subsequence from the sequence of command points to divide the sequence of command points, wherein division performed by the subsequence extraction unit is determined depending on whether an angle formed by straight lines connecting command points is within the division reference angle or not.

The path compressed by the point sequence compression unit may be the path compressed by the point sequence compression unit is a path connecting several points in the subsequence with a straight line.

The path compressed by the point sequence compression unit may be a curved path passing through several points in the subsequence. a curved path passing through several points in the subsequence.

The present invention can provide a numerical controller that has a command path compression function, with which, in compression of a sequence of command points, the same compression result can be obtained from the same sequence of command points while the sequence of command points is sequentially read, regardless of whether the sequence of command points is given in the forward direction or in the reverse direction.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

<Embodiment 1>

Figure 1:
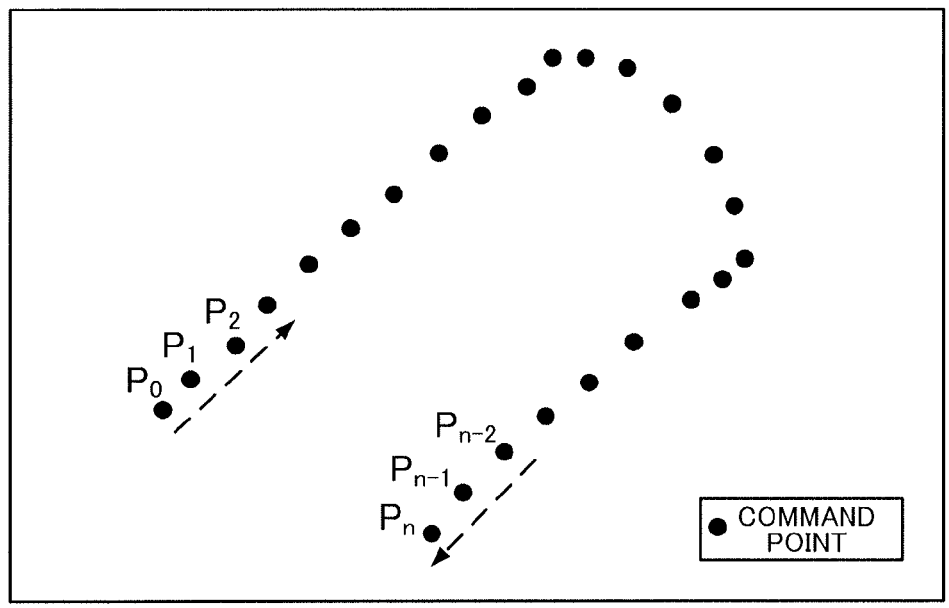
FIG. 1 is a diagram illustrating a sequence of command points formed by inputting a sequence of command points {P0, P1, . . . , Pn}, in which P0 is a start point and Pn is an end point.

An example will be described in which a sequence of command points that has been input is represented by an approximation straight line by compressing the sequence of command points. As illustrated in FIG. 1, an example is considered in which a sequence of command points {P0, P1, . . . , Pn}, in which P0 is a start point and Pn (n≥1) is an end point, is commanded as an NC program.

The sequence of command points {P0, P1, . . . , Pn} is extracted by a command reading unit from a commanded direction and divided into subsequences by a subsequence extraction unit and the subsequences are forwarded to a point sequence compression unit. The point sequence compression unit approximates the subsequences divided by the subsequence extraction unit by straight lines. The subsequence extraction unit and the point sequence compression unit will be described below.

[Subsequence Extraction Unit]

The subsequence extraction unit sequentially reads the sequence of command points {P0, P1, . . . , Pn} to extract a subsequence and forwards the subsequence thus extracted to the point sequence compression unit. The procedure for this process will be described below.

In a reading loop of the sequence of command points, command points are sequentially read from P0 (look-ahead), and the look-ahead is repeated until stopped according to conditions of a distance between command points and an angle. When the look-ahead is stopped, the point sequence thus read is forwarded to the point sequence compression unit as a subsequence, and if any part of the sequence of command points still remains, the subsequence extraction unit repeats the processing with the remaining of the sequence of command points used as an input. A command point read in the reading loop of the sequence of command points is to be Pm (0≤m≤n).

Figure 2:
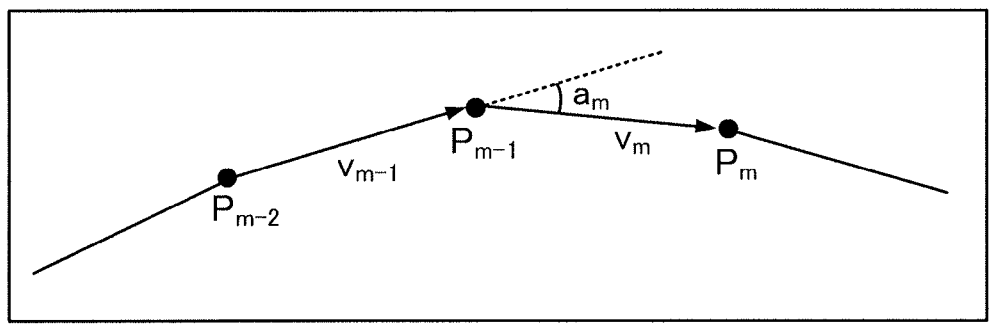
FIG. 2 is a diagram illustrating that a vector from Pm−1 to Pm is represented by vm and an angle formed by vm−1 and vm is represented by am.

As illustrated in FIG. 2, when a vector from Pm−1 to Pm is vm and an angle formed by vm−1 and vm is am, vm is represented as in Equation (1) described below and am is represented as in Equation (2) described below.

$$v_m = P_m - P_{m-1} \quad (1)$$
$$(1 \leq m \leq n)$$

$$\cos(a_m) = \frac{v_{m-1} \cdot v_m}{|v_{m-1}||v_m|} \quad (2)$$
$$(2 \leq m \leq n)$$

(A-1) When m=0:
P0 is read.
Look-ahead is continued with m=1.

(A-2) When m=2:
P1 is read, and v1 is calculated from P0 and P1 which have already been read, using Equation (3) described below.

$$v_1 = P_1 - P_0 \quad (3)$$

If the length of v1 is equal to or less than a division reference length vmax, which is preset by a division reference length setting unit, the look-ahead is continued. More specifically, if Equation (4) described below is satisfied, the look-ahead is continued, and if Equation (4) is not satisfied, the look-ahead is stopped.

$$|v_1| \leq v\max \quad (4)$$

If the look-ahead is stopped, {P0,P1} is extracted as a subsequence and forwarded to the point sequence compression unit. When n is not 1, the processing of the subsequence extraction unit is performed again on the remaining of the sequence of command points {P1, . . . , Pn} as {P'0, P'1 . . . , P'n−1}.

(A-3) When m≥2:
Pm is read, and vm is calculated from Pm−1 and Pm which have already been read, using Equation (5) described below.

$$v_m = P_m - P_{m-1} \quad (5)$$

Furthermore, am is calculated from vm−1 and vm which have already been read, using Equation (6) described below.

$$\cos(a_m) = \frac{v_{m-1} \cdot v_m}{|v_{m-1}||v_m|} \quad (6)$$

If the length of vm is equal to or less than vmax and cos(am) is equal to or more than cosine of a division reference angle, cosmax, the look-ahead is continued. The division reference angle is preset by a division reference angle setting unit. More specifically, if Equation (7) and Equation (8) described below are satisfied, the look-ahead is continued, and if Equation (7) or Equation (8) is not satisfied, the look-ahead is stopped.

$$|v_m| \leq v\max \quad (7)$$

$$\cos(a_m) \geq \cos \max \quad (8)$$

If the look-ahead is stopped due to Equation (7) or Equation (8) described above, {P0, . . . , Pm−1} is extracted as a subsequence and forwarded to the point sequence compression unit. The processing of the subsequence extraction unit is performed from the start on the remaining of the sequence of commands points {Pm−1, . . . , Pn} as an input point sequence {P0, P'n−m+1}.

When m=n, {P0, . . . , Pn} is extracted as a subsequence and the processing of the subsequence extraction unit is completed.

In this process, regardless of whether the sequence of command points {P0, P1, . . . Pn} is commanded in this order or commanded in the reverse order, that is, in the order of {Pn, Pn−1, . . . P0}, the determinations of Equations (4), (7), and (8) will be the same.

In this case, a subsequence is extracted using a division reference length and a division reference angle. However, other criteria may be used as long as the criteria do not depend on the commanded direction. For example, the area of a triangle formed by three adjacent command points serving as apexes may be used as a criterion, or the curvature of the circumscribing circle of the triangle may be used as a criterion.

[Point Sequence Compression Unit]

A subsequence {Q0, Q1, . . . , Qs} including S+1 points (s≥1), which has been received from the subsequence extraction unit, is compressed. In this process, compression means approximating a subsequence by a number of curves or straight lines which is smaller than the number of points in the subsequence. These points in the subsequence are all read, from Q0 to Qs, by the subsequence extraction unit and thus do not need to be sequentially read. In this case, the compression result is to be a straight line. The compression result is forwarded to an interpolation unit as a path Path(t) serving as a function of a parameter t. t changes from 0 to 1. When a path connecting from a point Qc to a point Qd by a straight line is represented using t, the path is represented by Line[c,d](t), which is represented by Equation (9) described below.

$$\text{Line}[c,d](t)=(1-t)Q_c+tQ_d \quad (9)$$

(B-1) When s=1:

A path connecting Q0 to Q1, which is represented by Equation (10) described below, is forwarded to the interpolation unit as a compression result.

$$\text{Path}(t)=\text{Line}[0,1](t) \quad (10)$$

Figure 3:
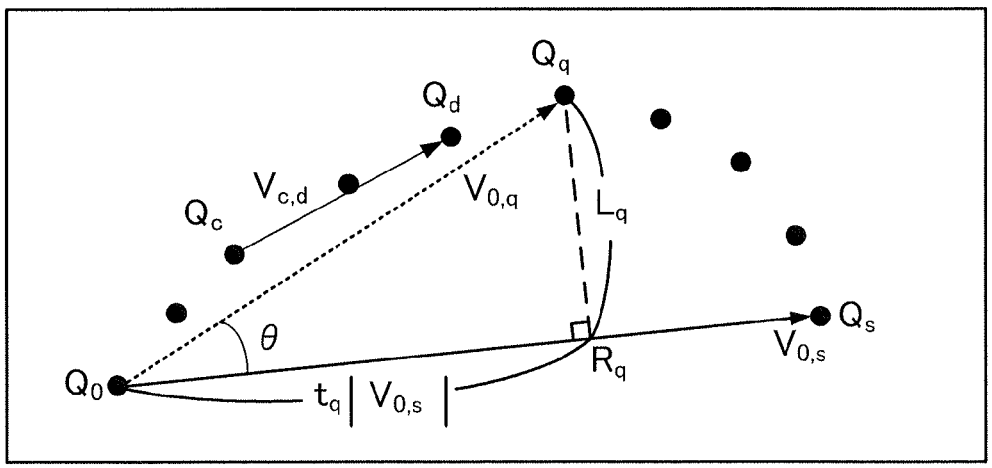
FIG. 3 is a diagram illustrating that a vector from Qc to Qd is represented by Vc,d.

(B-2) When s>1:

As illustrated in FIG. 3, partial points are to be Qc and Qd. A vector from Qc to Qd is represented by Vc,d. The vector Vc,d is represented by Equation (11) described below.

$$V_{c,d}=Q_d-Q_c \quad (11)$$

A unit vector in the direction of Vc,d is represented by Ec,d. The unit vector Ec,d is represented by Equation (12) described below.

$$E_{c,d} = \frac{V_{c,d}}{|V_{c,d}|} \quad (12)$$

Points other than both ends of the subsequence are to be Qq (0<q<s).

An angle θ formed by V0,q and V0,s is calculated by Equation 13 described below.

$$\sin\theta = \sqrt{1-(E_{0,q}\cdot E_{0,s})^2} \quad (13)$$

A distance Lq between a path Line[0,s](t) connecting Q0 to Qs with a straight line and Qq (0<q<s) is represented by Equation (14) described below.

$$L_q=|V_{0,q}|\sin\theta \quad (14)$$

Each distance Lq is compared with a preset tolerance T and a determination is made as to whether any q satisfying Equation (15) described below is present.

$$L_q>T \quad (15)$$

If no q satisfying Equation (15) described above is present, Path(t)=Line[0,s](t) is forwarded to the interpolation unit as a compression result.

By contrast, if any q satisfying Equation (15) described above is present, the q making the largest Lq is extracted, and the subsequence is divided before and after this q. More specifically, if Lq is the largest when q=w, the input subsequence {P0, P1, . . . , Ps} is divided into two subsequences, {P0, . . . Pw} and {Pw, . . . Ps}. The processing of the point sequence compression unit is recursively performed with all subsequences thus divided as inputs.

In this process, regardless of whether the input subsequence {Q0, Q1, . . . Qs} is input in this order or input in the reverse order, that is, in the order of {Qs, Qs−1, . . . , Q0}, the results from the straight-line creating method (Equations (9)) and the tolerance determination (Equation (15)) will be the same.

[Compression Result]

Figure 4:
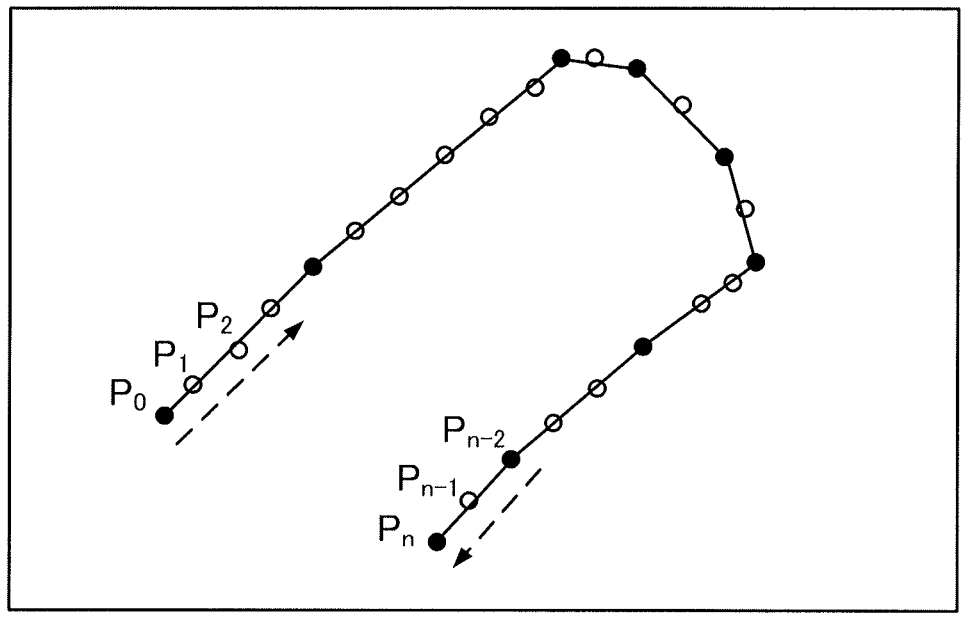
FIG. 4 is a diagram illustrating that a path {P0, P1, . . . Pn} illustrated in FIG. 1 is represented by a number of straight lines equal to or smaller than n as a result of compression.

By the units described above (the subsequence extraction unit and the point sequence compression unit), the path {P0, P1, . . . , Pn} illustrated in FIG. 1 is represented by a number of straight lines equal to or smaller than n, as illustrated in FIG. 4. Black points in FIG. 4 represent the end points of a straight line formed by compression, and white points represent command points other than the end points. The final path is to be a straight-line path connecting the black points, and the white points are to be points of which the distance from the straight-line path is within the tolerance T. With this configuration, the load caused by interpolation can be reduced while the path originally commanded is maintained within the tolerance, and unnecessary deceleration due to a very small corner can be avoided, whereby high-speed processing can be expected.

An example has been described above in which the sequence of command points is input in the order of the sequence {P0, P1, . . . , Pn}. With the present technique, the same path is obtained as in FIG. 4 even if the sequence of command points is input in the reverse order, that is, in the order of {Pn, Pn−1, . . . , P0}. This is because the division point determinations (Equations (4), (7), and (8)), which are performed by the subsequence extraction unit, and the straight-line creating method (Equations (9)) and the tolerance determination (Equation (15)), which are performed by the point sequence compression unit, are all techniques independent of the commanded direction of command points. With this configuration, when shape similarity is demanded between adjacent curves as in the case of an outward route and a return route in a reciprocation path, it is expected that unevenness in the path is minimized.

<Embodiment 2>

In Embodiment 1 described above, an example has been described in which a sequence of command points that has been input is represented by approximated straight lines by compressing the sequence of command points. Embodiment 2 will describe an example in which a sequence of command points that has been input is represented by approximated curves by compressing the sequence of command points.

As in Embodiment 1, an example is considered in which a sequence of command points {P0, P1, ..., Pn}, in which P0 is a start point and Pn (n≥1) is an end point, is commanded as an NC program. The sequence of command points {P0, P1, ..., Pn} is extracted by a command reading unit from a commanded direction and divided into subsequences by a subsequence extraction unit and the subsequences are forwarded to a point sequence compression unit. The point sequence compression unit approximates each of the subsequences divided by the subsequence extraction unit by a curve. Description of the subsequence extraction unit is the same as in Embodiment 1 and thus will be omitted. The details of the point sequence compression unit in Embodiment 2 are described below.

[Point Sequence Compression Unit]

A subsequence {Q0, Q1, ..., Qs} including S+1 points (s≥1), which has been received from the subsequence extraction unit, is compressed. These points in the subsequence are all read, from Q0 to Qs, by the subsequence extraction unit and thus do not need to be sequentially read. Although the compression result is a curved path of a three-dimensional B-spline curve in this case, a curve of other types such as a NURBS curve or a circular arc curve may be used. The compression result is forwarded to an interpolation unit as a path Path(t) serving as a function of a parameter t. t changes from 0 to 1.

In the subsequence {Q0, Q1, ..., Qs}, a point Q0 is a start point and a point Qs is an end point. A curved path of a B-spline curve passing through i points Qe1, ... Qei is to be BSpline[0,e1,e2, ..., ei,s](t). At this point, 1≤i≤s−1. The curved path is represented by Equation (16) described below.

$$BSpline[0, e_1, e_2, \ldots, e_i, s](t) = \sum_{j=0}^{i+3} N_{j,3}(t) R_j \quad (16)$$

Nj,3(t) is a basis function of the B-spline curve, and Rj is a control point of the B-spline curve. This B-spline curve is created such that the tangent direction vectors at the start point Q0 and the end point Qs respectively satisfy Equations (17) and (18) described below.

$$\frac{d}{dt} BSpline[0, e_1, e_2, \ldots, e_i, s](0) = 3(Q_1 - Q_0) \quad (17)$$

$$\frac{d}{dt} BSpline[0, e_1, e_2, \ldots, e_i, s](1) = 3(Q_s - Q_{s-1}) \quad (18)$$

The B-spline curve thus created is represented by Equation (19) described below and will be the same curved path even if the start point Q0, the end point Qs, and passing points Qe1, ..., Qei are input in the reverse order.

$$BSpline[0,e_1,e_2, \ldots, e_i, s](t) = BSpline[s,e_i,e_{i-1}, \ldots, e_1, 0](1-t) \quad (19)$$

The method of creating a B-spline curve as described above is a well-known technique and the description thereof thus will be omitted.

(C-1) When s=1:

A path connecting from Q0 to Q1 with a B-spline curve, which is represented by Equation (20) described below, is forwarded to the interpolation unit as a compression result.

$$Path(t) = BSpline[0,1](t) \quad (20)$$

(C-2) When s>1:

A path connecting from Q0 to Qs with a B-spline curve, which is represented by Equation (21), is created as an initial curve. More specifically, the B-spline curve is created on the assumption that the passing points Qe1, ... Qei described above are not present.

$$Path(t) = BSpline[0,s](t) \quad (21)$$

The distance between all points Qe other than Q0 and Qs (1≤e≤s−1) in the subsequence {Q0, Q1, Qs} and Path(t) is to be Le. That is, the distance Le is represented by Equation (22) described below.

$$L_e = \text{Dist}(Path(t), Q_e) \quad (22)$$

Dist is a function which gives the distance between a curve and a point and is calculated by an analytical or approximate method. The details of Dist are a well-known technique and the description thereof thus will be omitted. Each distance Le is compared with a preset tolerance T using Equation (23) described below and a determination is made as to whether each Le exceeds the tolerance T or not.

$$L_e > T \quad (23)$$

If no e satisfying Equation (23) described above is present, Path(t) is forwarded to the interpolation unit as a compression result.

By contrast, if any e satisfying Equation (23) described above is present, the e making the largest Le is extracted and set to emax. A point Qemax corresponding to each emax as described above is added to the passing points, and a B-spline curve is recreated. That is, the recreated B-spline curve is represented by Equation (24) described below.

$$Path(t) = BSpline[0,e_{max},s](t) \quad (24)$$

Using Equation (22) described above for this new Path(t) to recalculate Le, Equation (23) described above is determined. If no e satisfying Equation (23) is present, Path(t) is forwarded to the interpolation unit as a compression result. If any e satisfying Equation (23) is present, the e making the largest Le is extracted and set to emax2. A point Qemax2 is added to the passing points, and a B-spline curve is recreated. That is, the recreated B-spline curve is represented by Equation (25) described below.

$$Path(t) = BSpline[0,e_{max},e_{max2},s](t) \quad (25)$$

The procedure described above is repeated to add passing points until no e satisfying Equation (23) described above is present any more, before Path(t) is forwarded to the interpolation unit as a compression result. In this process, regardless of whether the subsequence {Q0, Q1, ..., Qs} that has been input is input in this order or input in the reverse order, that is, in the order of {Qs, Qs−1, ..., Q0}, the results from the B-spline creating method (Equations (16), (17), and (18)) and the tolerance determination (Equation (23)) will be the same.

The tangent direction vectors at the start point Q0 and the end point Qs in the B-spline curve are set to 3(Q1-Q0) and 3(Qs-Qs−1) respectively, in this case. However, a point Q−1 immediately before Q0 and a point Qs+1 immediately after Qs may be read, whereby the tangent direction vectors are set to 3(Q1-Q−1)/2 and 3(Qs+1-Qs−1)/2. Furthermore, the direction of a line contacting a circle passing through Q−1, Q0, Q1 at Q0 and the direction of of a line contacting a circle passing through Qs−1, Qs, Qs+1 at Qs may be set to the tangent direction vectors.

[Compression Result]

Figure 5:
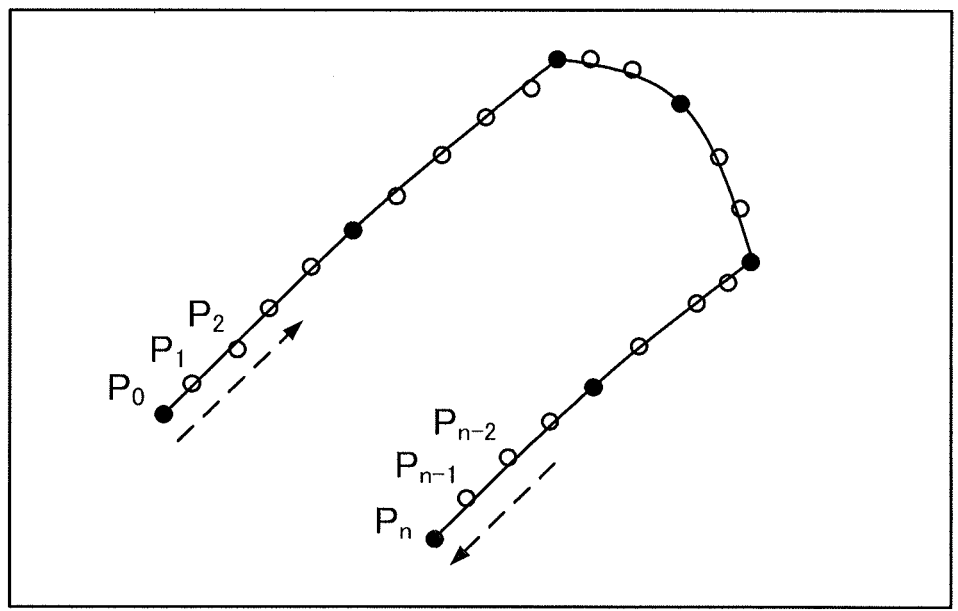
FIG. 5 is a diagram illustrating that a path {P0, P1, . . . Pn} illustrated in FIG. 1 is represented by a curve passing through a number of command points as a result of compression.

By the units described above, the path P0, P1, Pn illustrated in FIG. 1 is represented by a curve passing through a number of command points, as illustrated in FIG. 5. Black points in FIG. 5 represent the command points through which the path passes, and white points represent command points other than such command points.

The final path is to be a smoothly-curved path connecting the black points, and the white points are to be points of which the distance from the curved path is within the tolerance T. As in Embodiment 1, the same path is obtained as in FIG. 5 even if the sequence of command points is input in the reverse order, that is, in the order of {Pn, Pn−1, P0}.

With this configuration, in Embodiment 2 as well as in Embodiment 1, the load caused by interpolation can be reduced while the path originally commanded is maintained within the tolerance, and when shape similarity is demanded between adjacent curves as in the case of an outward route and a return route in a reciprocation path, it is expected that unevenness in the path is minimized. Furthermore, in Embodiment 2, because command points are compressed into a three-dimensional B-spline curve, command points covering a wide range can be represented by a small number of second differential continuous curve, whereby a smooth machining surface can be obtained.

(Functional Block Diagram)

Figure 6:
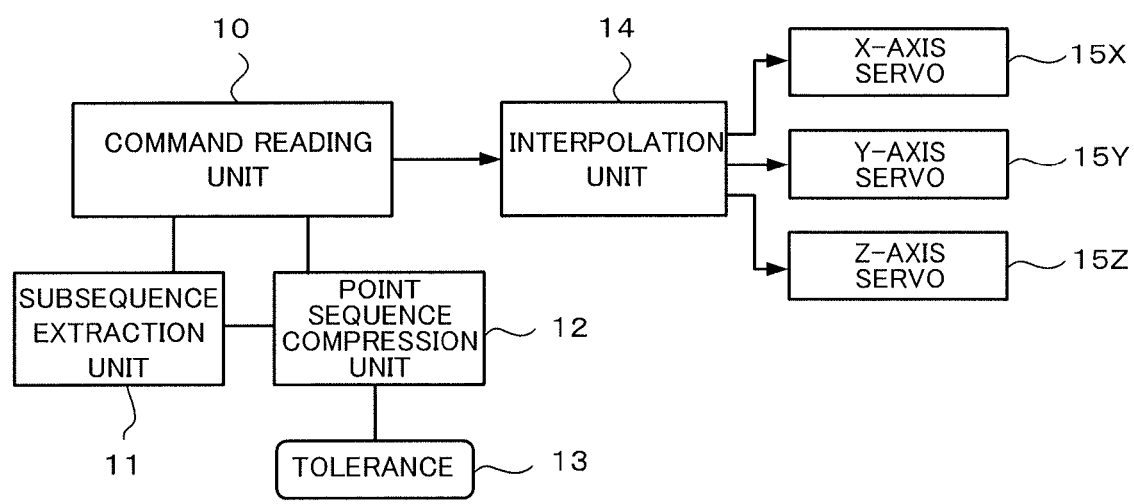
FIG. 6 is a functional block diagram explaining an example of a numerical controller according to the present invention.

FIG. 6 is a functional block diagram explaining an example of a numerical controller according to the present invention.

In general, in a numerical controller, a command reading unit 10 analyzes a machining program and converts the machining program into an executable format. An interpolation unit 14 performs interpolation processing based on the executable format, outputs a move command for each axis, and controls driving of the servo of each axis (an X-axis servo 15X, a Y-axis servo 15Y, and a Z-axis servo 15Z), based on the move command for each axis.

This command reading unit 10 includes a subsequence extraction unit 11 and a point sequence compression unit 12. The subsequence extraction unit 11 divides the sequentially read sequence of command points in a manner such that the same result may be obtained regardless of the commanded direction of the path by determining division points according to the shape of the sequence of command points, and outputs the result to the point sequence compression unit 12. The point sequence compression unit 12 approximates the path formed of the input subsequence by a curve or a straight line using the method independent of the direction to reduce the load on the interpolation unit 14 and outputs the path thus approximated to the interpolation unit 14. The point sequence compression unit 12 refers to a preset tolerance 13.

(Flowchart)

Figure 7:
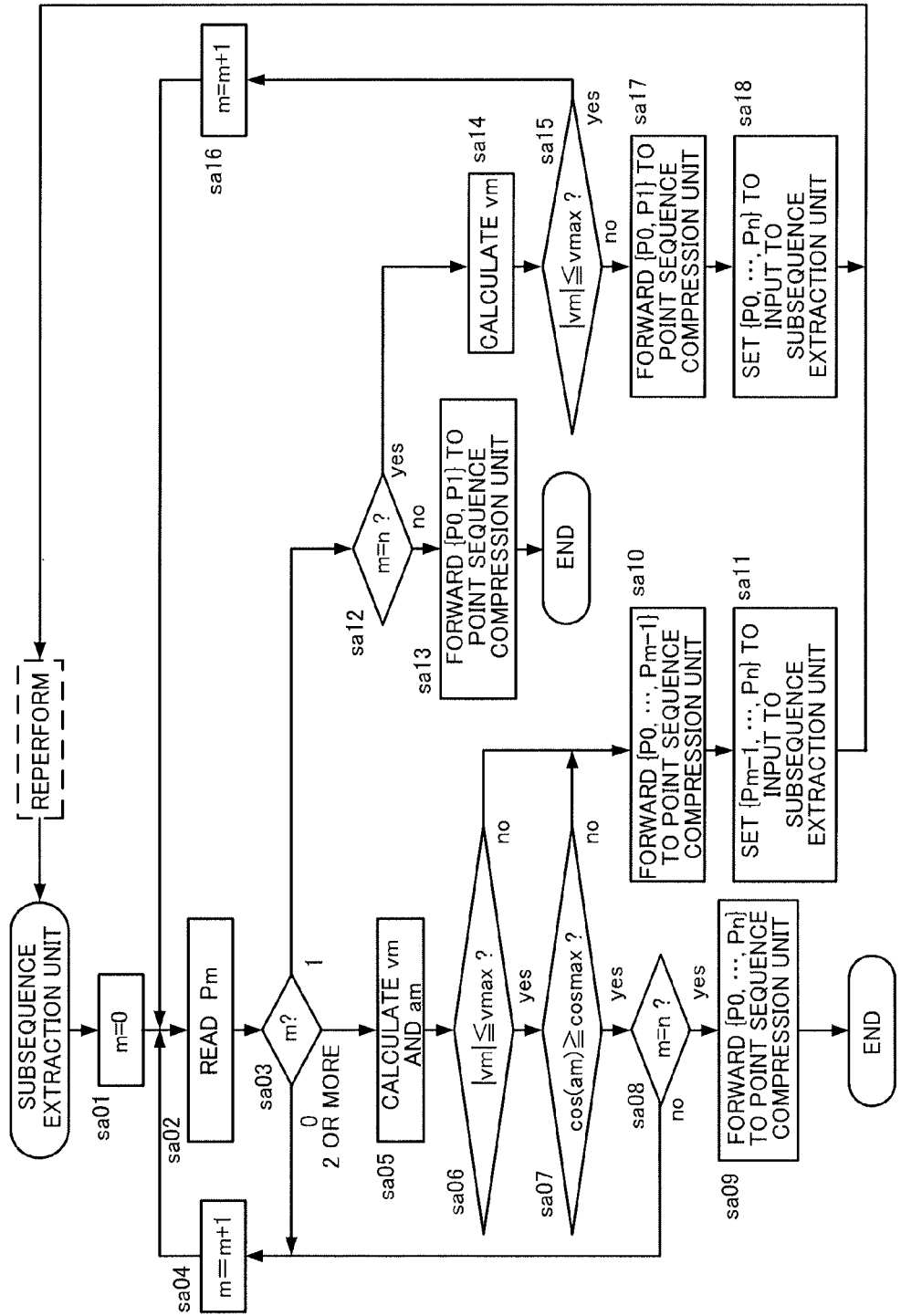
FIG. 7 is a flowchart illustrating the flow of subsequence extraction processing performed by a subsequence extraction unit (Embodiment 1) in FIG. 6.

The flow of the subsequence extraction processing performed by the subsequence extraction unit 11 illustrated in FIG. 6 (Embodiment 1) will be described with reference to a flowchart in FIG. 7. The flow will be described below according to each step in the flowchart.

[Step sa01] m is set to the initial value (=0).
[Step sa02] Data of a command point Pm is read.
[Step sa03] Classification is performed according to the value of m. If m=0, the processing proceeds to Step sa04. If m=1, the processing proceeds to Step sa12. If m≥2, the processing proceeds to Step sa05.
[Step sa04] The value obtained by adding 1 to m is set to m and the processing returns to Step sa02.
[Step sa05] vm and am are calculated.
[Step sa06] A determination is made as to whether the absolute value of vm is equal to or less than vmax. If the absolute value of vm is equal to or less than vmax (YES), the processing proceeds to Step sa07. If the absolute value of vm is not equal to or less than vmax (NO), the processing proceeds to Step sa10.
[Step sa07] A determination is made as to whether cos(am) is equal to or more than cosmax. If cos(am) is equal to or more than cosmax (YES), the processing proceeds to Step sa08. If cos(am) is not equal to or more than cosmax (NO), the processing proceeds to Step sa10.
[Step sa08] A determination is made as to whether m is equal to n or not. If m is equal to n (YES), the processing proceeds to Step sa09. If m is not equal to n (NO), the processing returns to Step sa04.
[Step sa09] A sequence of command points {P0, . . . Pn} is forwarded to the point sequence compression unit 12 and the subsequence extraction processing is completed.
[Step sa10] A subsequence {P0, . . . , Pm−1} is forwarded to the point sequence compression unit 12.
[Step sa11] A subsequence {Pm−1, . . . , Pn} is set to an input to the subsequence extraction unit 11. More specifically, the processing returns to Step sa01 and the subsequence extraction processing is performed again.
[Step sa12] A determination is made as to whether m is equal to n. If m is equal to n (YES), the processing proceeds to Step sa13. If m is not equal to n (NO), the processing returns to Step sa14.
[Step sa13] {P0, P1} is forwarded to the point sequence compression unit 12 and this subsequence extraction processing is completed.
[Step sa14] vm is calculated.
[Step sa15] A determination is made as to whether the absolute value of vm is equal to or less than vmax. If the absolute value of vm is equal to or less than vmax (YES), the processing proceeds to Step sa16. If the absolute value of vm is not equal to or less than vmax (NO), the processing proceeds to Step sa17.
[Step sa16] 1 is added to m to renew m (that is, m=m+1).
[Step sa17] {P0, P1} is forwarded to the point sequence compression unit 12.
[Step sa18] The sequence of command points {P0, . . . , Pn} is set to an input to the subsequence extraction unit 11. More specifically, the processing returns to Step sa01 and the subsequence extraction processing is performed again.

Figure 8:
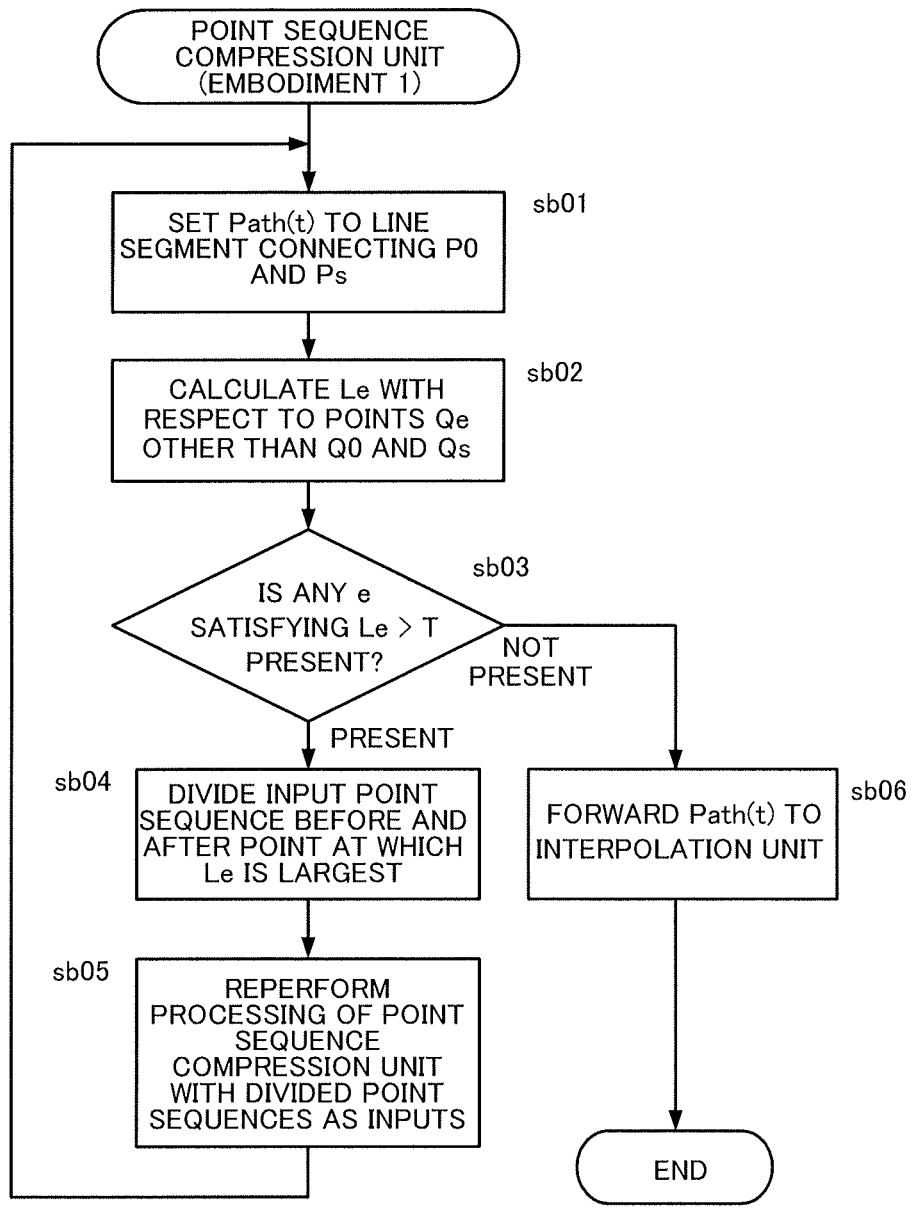
FIG. 8 is a flowchart illustrating the flow of point sequence compression processing performed by a point sequence compression unit (Embodiment 1) in FIG. 6.

The flow of the point sequence compression processing performed by the point sequence compression unit 12 illustrated in FIG. 6 (Embodiment 1) will be described with reference to a flowchart in FIG. 8. The flow will be described below according to each step in the flowchart.

[Step sb01] Path(t) is set to a line segment connecting P0 and Ps.
[Step sb02] Le is calculated with respect to points Qe other than Q0 and Qs.
[Step sb03] A determination is made as to whether any e satisfying Le>T is present. If any e satisfying Le>T is present (YES), the processing proceeds to Step sb04. If no e satisfying Le>T is present (NO), the processing proceeds to Step sb06.
[Step sb04] The input point sequence is divided before and after the point at which Le is the largest.
[Step sb05] The point sequence compression processing is performed again with each of the divided point sequence as an input and the processing returns to Step sb01.
[Step sb06] Path(t) is forwarded to the interpolation unit 14 and this point sequence compression processing is completed.

Figure 9:
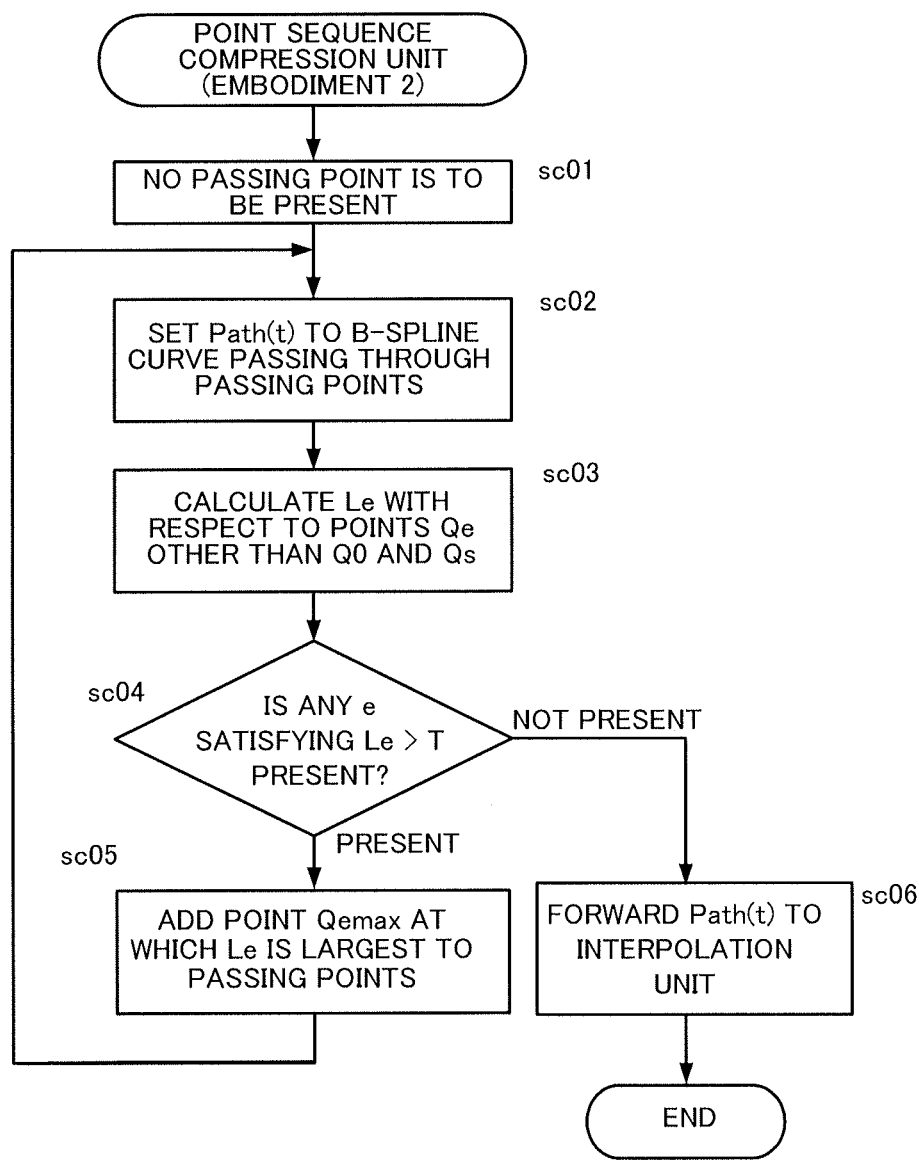
FIG. 9 is a flowchart illustrating the flow of point sequence compression processing performed by a point sequence compression unit (Embodiment 2) in FIG. 6.

The flow of the point sequence compression processing performed by the point sequence compression unit 12 illustrated in FIG. 6 (Embodiment 2) will be described with reference to a flowchart in FIG. 9. The flow will be described below according to each step in the flowchart.

[Step sc01] No passing point is to be present.

[Step sc02] Path(t) is set to a B-spline curve passing through passing points.

[Step sc03] Le is calculated with respect to points Qe other than Q0 and Qs.

[Step sc04] A determination is made as to whether any e satisfying Le>T is present or not. If any e satisfying Le>T is present (YES), the processing proceeds to Step sc05. If no e satisfying Le>T is present (NO), the processing proceeds to Step sc06.

[Step sc05] All the points at which Le is the largest are added to the passing points and the processing proceeds to Step sc02.

[Step sc06] Path(t) is forwarded to the interpolation unit 14 and this point sequence compression processing is completed.

The invention claimed is:

1. A numerical controller that controls a machine tool composed of a plurality of driving axes including at least two straight-line axes that perform processing on a workpiece attached to a table, the numerical controller comprising:
    a command reading unit configured to read a command path being a sequence of a plurality of command points and a relative feed speed command of the workpiece and a tool;
    a subsequence extraction unit configured to extract a subsequence from the sequence of command points to divide the sequence of command points in a manner such that the same path may be created regardless of whether the command points read are extracted by the command reading unit from a commanded direction or from a direction reverse to the commanded direction;
    a point sequence compression unit configured to create a compressed path approximated by a straight line or a curve of which the distance from each command point in the extracted subsequence is within a preset tolerance in a manner such that the compressed path may be approximated, based on a straight-line creating method or a curve creating method and a tolerance determination that do not depend on the commanded direction, by the same straight line or curve regardless of whether the compressed path is created from the extracted subsequence in a commanded direction or in a direction reverse to the commanded direction;
    an interpolation unit configured to obtain the position of each axis for each interpolation cycle in a manner such that the tool may move at the commanded relative feed speed on the path compressed by the point sequence compression unit; and
    a motor driving unit configured to drive a motor of each axis to move to the position of each axis obtained by the interpolation unit.

2. The numerical controller according to claim 1, further comprising:
    a division reference length setting unit configured to set a division reference length used for extracting a subsequence from the sequence of command points to divide the sequence of command points, wherein
    division performed by the subsequence extraction unit is determined depending on whether a length between command points is within the division reference length or not.

3. The numerical controller according to claim 2, wherein the path compressed by the point sequence compression unit is a path connecting several points in the subsequence with a straight line.

4. The numerical controller according to claim 2, wherein the path compressed by the point sequence compression unit is a curved path passing through several points in the subsequence.

5. The numerical controller according to claim 1, further comprising:
    a division reference angle setting unit configured to set a division reference angle used for extracting a subsequence from the sequence of command points to divide the sequence of command points, wherein
    division performed by the subsequence extraction unit is determined depending on whether an angle formed by straight lines connecting command points is within the division reference angle or not.

6. The numerical controller according to claim 5, wherein the path compressed by the point sequence compression unit is a path connecting several points in the subsequence with a straight line.

7. The numerical controller according to claim 5, wherein the path compressed by the point sequence compression unit is a curved path passing through several points in the subsequence.

8. The numerical controller according to claim 1, wherein the path compressed by the point sequence compression unit is a path connecting several points in the subsequence with a straight line.

9. The numerical controller according to claim 1, wherein the path compressed by the point sequence compression unit is a curved path passing through several points in the subsequence.

* * * * *